No. 645,385. Patented Mar. 13, 1900.
I. COPELAND.
APPARATUS FOR CEMENT COATING AND PACKING NAILS.
(Application filed June 13, 1898.)
(No Model.) 3 Sheets—Sheet 1.
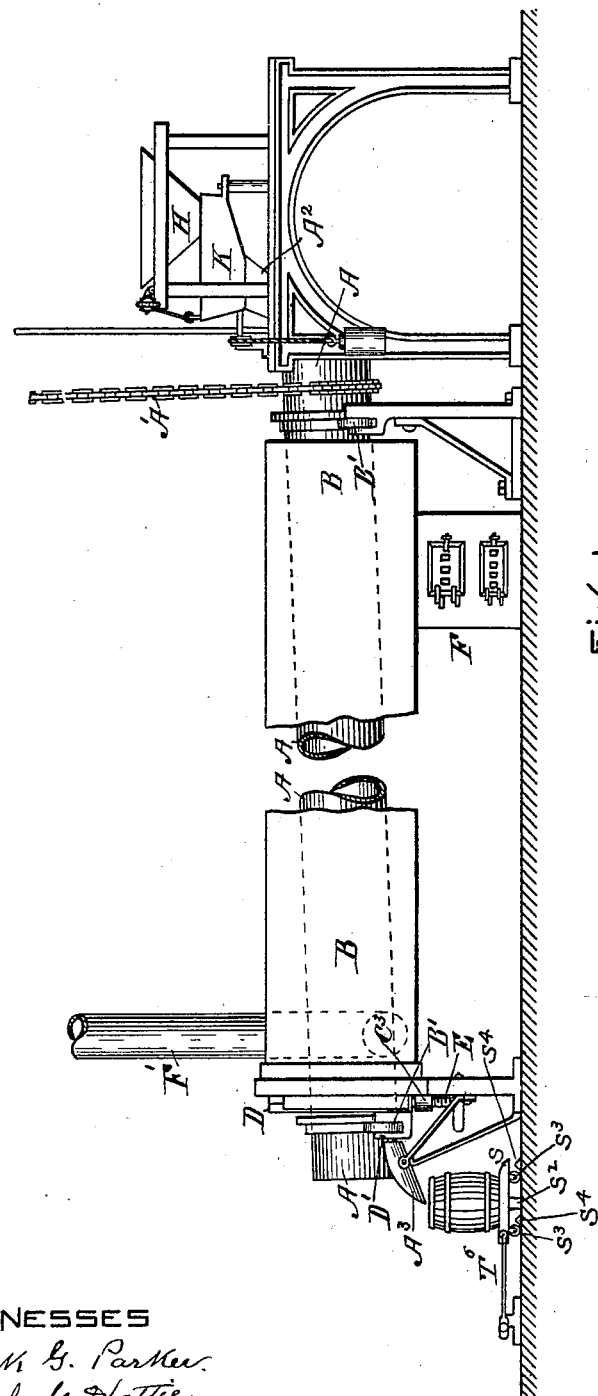
WITNESSES
Frank G. Parker
Frank H. Hattie
INVENTOR
Ira Copeland

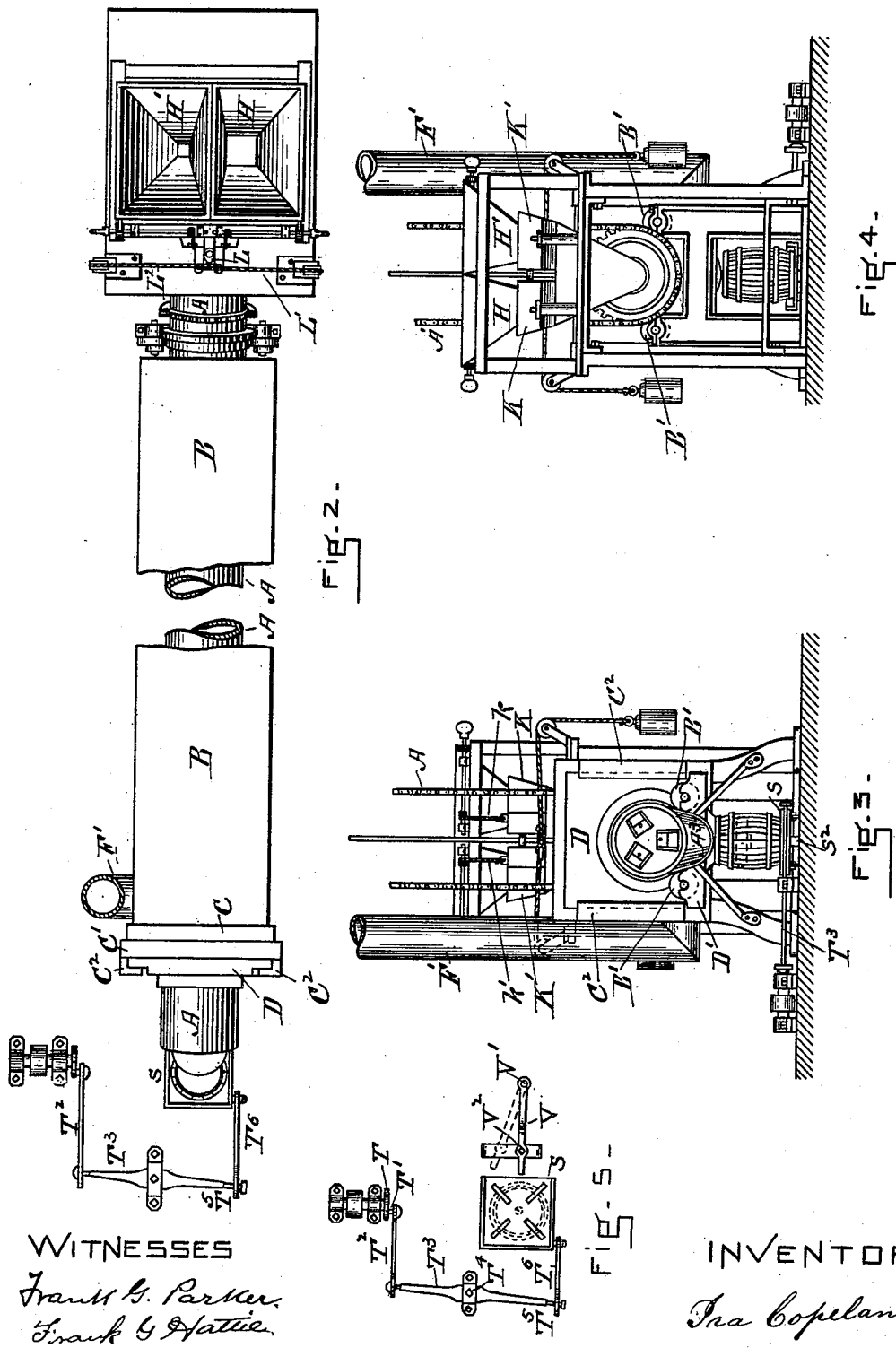

No. 645,385. Patented Mar. 13, 1900.
I. COPELAND.
APPARATUS FOR CEMENT COATING AND PACKING NAILS.
(Application filed June 13, 1898.)
(No Model.) 3 Sheets—Sheet 3.

WITNESSES
Frank G. Parker
Frank G. Hattie

INVENTOR
Ira Copeland

UNITED STATES PATENT OFFICE.

IRA COPELAND, OF NEWTON, MASSACHUSETTS.

APPARATUS FOR CEMENT-COATING AND PACKING NAILS.

SPECIFICATION forming part of Letters Patent No. 645,385, dated March 13, 1900.

Application filed June 13, 1898. Serial No. 683,371. (No model.)

*To all whom it may concern:*

Be it known that I, IRA COPELAND, of Newton, in the county of Middlesex and State of Massachusetts, have invented a new and useful Improvement in Apparatus for Cement-Coating and Packing Nails, of which the following, taken in connection with the accompanying drawings, is a specification.

My invention relates to an apparatus for cement-coating nails; and it consists in means for mingling the cement and nails and of subjecting the cement and nails to heat, in automatically delivering and packing the treated nails, and also in the combination of mechanisms for effecting these results.

The more exact characteristics of my invention may be best understood by reference to the following description, illustrated by drawings, of which—

Figure 6:
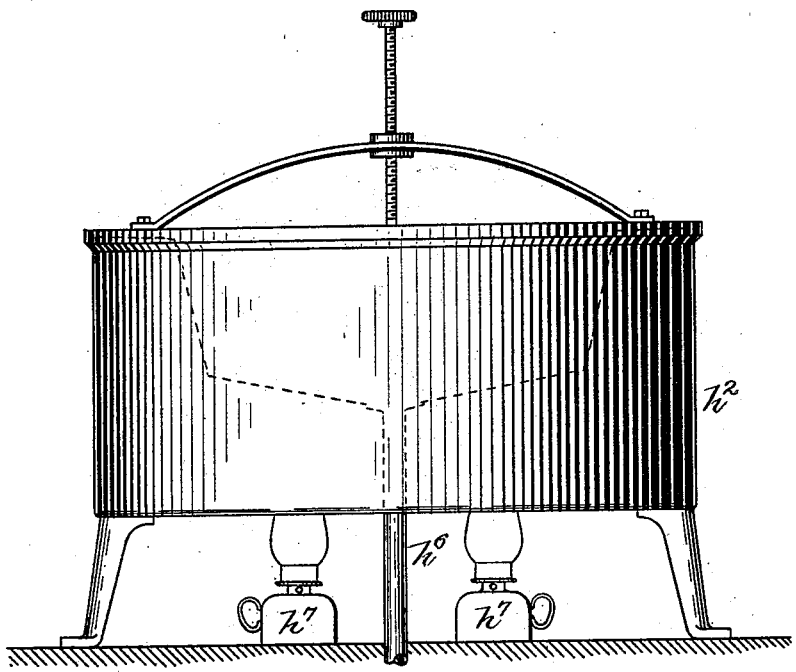
Figure 7:
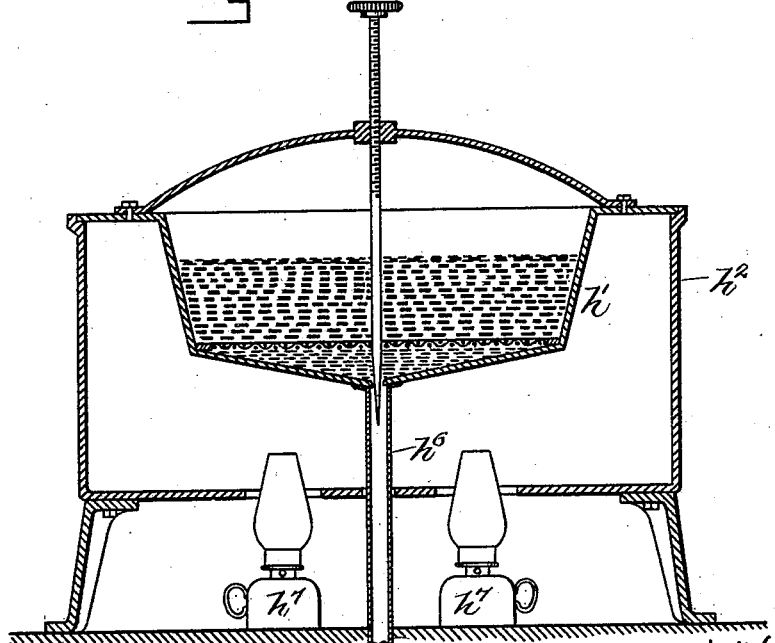

Figure 1 is a side elevation. Fig. 2 is a plan. Fig. 3 is an end elevation looking from the left of Fig. 1. Fig. 4 is an end elevation looking from the right of Fig. 1. Fig. 5 is a plan showing device for settling the nails as they are deposited in the keg. Fig. 6 shows in elevation a modification of one of the parts. Fig. 7 is a vertical section of the device shown in Fig. 6.

In the drawings, A A A represent a long metal cylinder so mounted that its inclination may be varied and adapted to be rotated by a sprocket-chain A' or by other suitable means. This cylinder is inclosed in a casing B B, which may be of sheet metal, covered by asbestos or other heat-retainer, or, if desirable, the cylinder may be inclosed in masonry. For heating the cylinder and its contents one or more furnaces, as F, may be used. The said furnace or furnaces may open directly into the chamber formed by the casing B, from which the products of combustion may pass off through the flue F'.

The cylinder A is represented as supported on antifriction-rollers B' B'.

A hopper H is arranged to receive nails, which in leaving the hopper pass into a shaking shoe K and gradually slide down the shoe into the chute $A^2$ and thence into the rotating cylinder A. A second hopper H' is adapted to receive the prepared cement, which passes through the shoe K' and chute $A^2$, and thence, with the nails, into the rotating cylinder.

The shaking shoes K and K' are caused to vibrate by the cam L, which is placed between the free ends of the shoes, and by its rapid rotation imparts motion to both shoes. Cords L' $L^2$ serve to hold the shoes against the cam so that it will act upon them.

To regulate the delivery of the nails and cement from the shaking shoes, each is hung independently of the other upon a cord or chain $k$ $k'$, by which the free end of the shaking shoe may be raised or lowered. As the hoppers and their connections are not new, but of ordinary well-known construction, they need not be fully described.

The cement-hopper H' and its adjuncts may be omitted and a melting reservoir or kettle hopper (illustrated in Figs. 6 and 7) may be substituted. This device consists of a kettle $h'$, properly incased by the cylinder $h^2$ and adapted to be heated by lamps $h^7$ $h^7$ or by any of the well-known appliances used for such purposes. A tube $h^6$ leads from the bottom of the kettle to a point from which the liquid cement will be deposited upon the mass of nails as they enter the rotating cylinder or agitator.

The lower end of the rotating cylinder A is mounted upon antifriction-rollers B' B', which are journaled upon the sliding end plate D D'. This end plate D D' slides vertically in ways $C^2$ $C^2$, formed on the metallic frame C C', which is securely attached to the casing B. A hand-screw E, working in the bracket-piece $C^3$, attached to the frame C' C, is adapted to raise or lower the end plate D, and thus cause the rotating cylinder A to assume any desired inclination. A chute $A^3$ conducts the cemented nails from the cylinder to the keg.

The device for settling the nails in the keg is shown partly in elevation in Fig. 1 and in plan in Fig. 5. This consists of an oscillating platform S, mounted upon a central pivot $S^2$, and casters $S^3$ $S^3$, which, as they roll over the fixed projections $S^4$ $S^4$, cause the platform to jostle violently. This motion, together with the oscillating motion, causes the nails to readily settle into the keg. The oscillating motion is given to the platform S by the crank-pin T' on the rotating disk T, which operates through the link T², lever T³ T⁵, pivoted at T⁴, and the link T⁶. A swinging block V, pivoted at V', serves when in the position indicated by full lines to prevent the keg from being jostled off from the oscillating table S. This block V may be turned away, as indicated by dotted lines, by withdrawing the pin V², in which case the keg may be removed and another one put in its place.

In using the above-described apparatus the nails or other articles to be cement-coated are placed in one of the hoppers H H' and the cement in the other. To regulate the amount of nails and the amount of cement entering the cylinder, the inclination of the shaking shoes K and K' may be regulated by adjustment of the cords $k$ $k'$. As the cylinder is in constant rotation, the nails and cement falling from the shoes through the chute into it will be carried slowly through the cylinder and heated, being kept in constant agitation until delivered to the chute A³ and thence to the keg in which they are packed. This continuous rotation of the agitator avoids danger of burning the cement due to the stoppage of the agitator for the purpose of discharging and recharging it, an objectionable feature in the operation of the type of agitator used in the primitive stage of the art.

It is obvious that in using the above-described continuously-operating agitator, together with its adjustable feeding and delivery devices, as above set forth, the nails must be weighed after they are coated; but this continuously-operating agitator may be so used as to receive abruptly a definite quantity of nails, together with a proper quantity of cement, thus avoiding a subsequent weighing of the product.

To satisfactorily cement-coat nails the following conditions should be observed: A cement having certain characteristics must be used. It should form but a thin coat on the nails; otherwise when packed hot in kegs they would become so strongly cemented together as to not readily separate and when separated would present roughness of surface to an objectionable extent. It must adhere firmly to the nail, which requires the nail to be properly heated, as even hot cement will not firmly adhere to cold nails. Its melting-point must be such that it will not be sticky at ordinary temperatures and that it will soften by the heat generated in driving, so as to form a union with the wood into which it is driven. It should be homogeneous as to its melting-point, and its distribution should be equable. The operation should be such that a proportionate amount of cement shall be applied to a certain amount of nails. The mechanical action should be so controllable that all of the nails shall have the requisite amount of agitation in connection with the cement to secure equable distribution of the cement. The thermal action should be uniform within certain limits of temperature and steady.

In order to automatically charge the continuously-rotating agitator or cylinder A A A not only with nails fed into it at a regular rate, but also with coating material fed also at a regular rate and in definite proportion to the quantity of nails, it is essential to have the coating in a granulated form or else in a liquid form.

I claim—

1. In an apparatus for cement-coating nails, an agitator running in a heated chamber, and regulatable devices for proportionally feeding nails and cement to the said agitator; substantially as and for the purposes set forth.

2. In an apparatus for cement-coating nails, a self-delivering agitator running in a heated chamber, regulatable devices for proportionally feeding nails and cement to the said agitator, a chute adapted to receive the cement-coated nails from the agitator and deliver the same to the keg, and a nail-packing device; substantially as and for the purpose set forth.

In testimony whereof I have signed my name to this specification, in the presence of two subscribing witnesses, on this 6th day of June, A. D. 1898.

IRA COPELAND.

Witnesses:
 FRANK G. PARKER,
 WILLIAM EDSON.